US012016104B2

(12) United States Patent
Son et al.

(10) Patent No.: US 12,016,104 B2
(45) Date of Patent: Jun. 18, 2024

(54) INDUCTION HEAT COOKING APPARATUS AND METHOD FOR OPERATING THE SAME

(71) Applicant: LG Electronics Inc., Seoul (KR)

(72) Inventors: Seongho Son, Seoul (KR); Jaekyung Yang, Seoul (KR); Hyojin Choi, Seoul (KR); Yongsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 590 days.

(21) Appl. No.: 17/141,749

(22) Filed: Jan. 5, 2021

(65) Prior Publication Data

US 2021/0127463 A1 Apr. 29, 2021

Related U.S. Application Data

(63) Continuation of application No. 15/843,862, filed on Dec. 15, 2017, now Pat. No. 10,917,947.

(30) Foreign Application Priority Data

Dec. 15, 2016 (KR) ........................ 10-2016-0171801

(51) Int. Cl.
*H05B 6/12* (2006.01)
*H05B 6/06* (2006.01)

(52) U.S. Cl.
CPC ............... *H05B 6/12* (2013.01); *H05B 6/062* (2013.01)

(58) Field of Classification Search
CPC .................................. H05B 6/12; H05B 6/062
See application file for complete search history.

(56) References Cited

U.S. PATENT DOCUMENTS

| | | | |
|---|---|---|---|
| 3,697,717 | A | 10/1972 | Kornrumpf et al. |
| 5,828,563 | A | 10/1998 | Suzuki et al. |
| 7,368,688 | B2 | 5/2008 | Kim et al. |
| 8,621,985 | B2 | 1/2014 | Elissen |

(Continued)

FOREIGN PATENT DOCUMENTS

| | | |
|---|---|---|
| CN | 104135784 | 11/2014 |
| GB | 2520922 | 6/2015 |

(Continued)

OTHER PUBLICATIONS

EP Communication of a Notice of Opposition in European Appln. No. 19177841.4, dated May 18, 2021, 39 pages.

(Continued)

*Primary Examiner* — Dana Ross
*Assistant Examiner* — Kuangyue Chen
(74) *Attorney, Agent, or Firm* — Fish & Richardson P.C.

(57) ABSTRACT

An induction heat cooking apparatus includes a rectifier configured to convert an AC voltage supplied from a power source into a DC voltage, a battery configured to store power, a switch configured to connect to at least one of the rectifier or the battery, an inverter connected to the switch and configured to receive a first voltage from at least one of the rectifier or the battery and convert the first voltage to a second voltage, and a heating coil configured to receive the second voltage from the inverter and generate magnetic fields in which the heating coil is configured to heat a cooking device based on the generated magnetic fields.

14 Claims, 14 Drawing Sheets

(56) References Cited

U.S. PATENT DOCUMENTS

| | | | | |
|---|---|---|---|---|
| 10,085,303 | B2 | 9/2018 | Schilling et al. | |
| 10,097,040 | B2 | 10/2018 | Van Wageningen et al. | |
| 2002/0117497 | A1 | 8/2002 | Bassill et al. | |
| 2003/0029863 | A1 | 2/2003 | Morrison | |
| 2003/0111461 | A1 | 6/2003 | Morrison | |
| 2010/0244571 | A1 | 9/2010 | Spitaels et al. | |
| 2010/0315849 | A1 | 12/2010 | Ingemi et al. | |
| 2011/0127951 | A1* | 6/2011 | Walley .................... | H02J 50/10<br>320/108 |
| 2014/0076887 | A1 | 3/2014 | Toh | |
| 2014/0144902 | A1 | 5/2014 | Oh et al. | |
| 2015/0047513 | A1 | 2/2015 | Okano et al. | |
| 2018/0192479 | A1* | 7/2018 | Kwack ................... | H05B 6/062 |
| 2019/0045586 | A1 | 2/2019 | Son et al. | |

FOREIGN PATENT DOCUMENTS

| | | | | |
|---|---|---|---|---|
| JP | H046790 | | | 1/1992 |
| JP | H04292893 | | | 10/1992 |
| JP | H07235372 | | | 9/1995 |
| JP | H0815972 | | | 1/1996 |
| JP | H11111442 | | | 4/1999 |
| JP | 2004016416 | | | 1/2004 |
| JP | 2005149990 | | | 6/2005 |
| JP | 2006278192 | | | 10/2006 |
| JP | 2008004416 | | | 1/2008 |
| JP | 2012003915 | | | 1/2012 |
| JP | 2014099253 | | | 5/2014 |
| JP | 2014116124 | | | 6/2014 |
| JP | 2014229423 | | | 12/2014 |
| JP | 2016004669 | | | 1/2016 |
| JP | 2016004669 | A | * | 1/2016 |
| KR | 1020120036502 | | | 5/2012 |
| WO | WO2015167568 | | | 11/2015 |

OTHER PUBLICATIONS

EP Communication of Notices of Opposition in European Appln. No. 19177841.4, dated Jun. 9, 2021, 1 page.

European Office Action in European Appln. No. 17207089.9, dated Jun. 17, 2020, 1 page.

European Office Action in European Appln. No. 17207098.9, dated May 6, 2020, 41 pages.

Extended European Search Report in European U.S. Appl. No. 17/207,098, dated May 17, 2018, 5 pages.

Translation of the Description of JP2014/116124(A)—Jun. 26, 2014, Teramoto, et al. in English, furnished by ESpace.net services, 2020.

Translation of the entire specification of the Japanese publication JP 2016004669A, Jan. 12, 2016, itsubishi Electric Corp., et al., the translation provided by ESpace.net, 2016.

* cited by examiner

Related Art

INDUCTION HEAT COOKING APPARATUS AND METHOD FOR OPERATING THE SAME

CROSS-REFERENCE TO RELATED APPLICATIONS

The present application is a continuation of U.S. application Ser. No. 15/843,862, filed on Dec. 15, 2017, which claims priority under 35 U.S.C. 119 and 35 U.S.C. 365 to Korean Patent Application No. 10-2016-0171801, filed on Dec. 15, 2016, which are hereby incorporated by reference in their entirety.

FIELD

The present disclosure relates to an induction heat cooking apparatus and a method for operating the same.

BACKGROUND

In recent years, the markets for electric ranges are gradually increasing. Electric ranges may not generate carbon monoxide which can be produced by a combustion process, and may have a low risk level of accidents such as gas leakage or fire.

Electric ranges include highlight-type electric ranges that can convert electricity into heat by using a nichrome wire having a high electrical resistance, and induction-type electric ranges that can generate magnetic fields to apply heat through an induction heating method.

Induction heat cooking apparatus may include electric ranges that can be operated by an induction method. An example operation principle of the induction heat cooking apparatus will be described as follows.

An induction heat cooking apparatus may operate based on high frequency current flowing through a working coil or a heating coil that is provided in the induction heat cooking apparatus. When the high frequency current flows through the working coil or the heating coil, lines of magnetic force are generated. The lines of the magnetic force generated in the working coil or the heating coil generate an eddy current when passing through a cooking device. The eddy current flowing through the cooking device may generate heat to heat a container of the cooking device. As the container is heated, contents in the container can be heated.

As described above, the induction heat cooking apparatus includes an electric cooking apparatus using a principle of inducing heat to the cooking device to heat the contents. The induction heat cooking apparatus may not affect indoor air quality or cause pollution of indoor air because induction heating may not consume oxygen or exhaust gases during heating. In addition, the induction heat cooking apparatus may have high energy efficiency and stability, and reduce a risk of burn by heating the container itself.

SUMMARY

In some implementations, an induction heat cooking apparatus may be configured to operate in a wired mode and a wireless mode.

In some implementations, an induction heat cooking apparatus may be configured to constantly output low power.

In some implementations, an induction heat cooking apparatus may be able to secure safety operating in wired or wireless manners, and may be configured to linearly output low power.

According to one aspect of the subject matter described in this application, an induction heat cooking apparatus includes a rectifier configured to convert an alternating current (AC) voltage supplied from a power source into a direct current (DC) voltage, a battery configured to store power, a switch configured to connect to at least one of the rectifier or the battery, an inverter connected to the switch and configured to receive a first voltage from at least one of the rectifier or the battery and convert the first voltage to a second voltage, and a heating coil configured to receive the second voltage from the inverter and generate magnetic fields, where the heating coil is configured to heat a cooking device based on the generated magnetic fields.

Implementations according to this aspect include one or more of the following features. For example, the cooking apparatus may further include an operation mode setting unit configured to receive a selection of one of a wired mode or a wireless mode, and a driving unit configured to control the switch to connect to the rectifier based on the selection of the wired mode, and to control the switch to connect to the battery based on the selection of the wireless mode. The battery may be further configured to, based on the switch being connected to the rectifier, be charged by power received from the power source. The battery may be further configured to, based on the switch being connected to the battery, supply power to the inverter.

In some implementations, the cooking apparatus may further include a power adjustment unit configured to receive a command for setting a power level, where the driving unit is further configured to control the switch to connect to the rectifier based on the set power level exceeding a reference level, and to control the switch to connect to the battery based on the set power level being below the reference level. The inverter may include an insulated gate bipolar transistor (IGBT) switching device configured to supply current to the heating coil. The IGBT switching device may have a maximum switching frequency that limits a minimum output power of the cooking apparatus, and the reference level may correspond to the minimum output power of the cooking apparatus.

In some implementations, the battery may be further configured to supply a voltage to the inverter to thereby provide power that is less than the minimum output power of the cooking apparatus. In some examples, the cooking apparatus may further include a diode configured to prevent the power source and the battery from being short-circuited with each other.

In some examples, the switch may include a three-terminal relay switch that includes a common (COM) terminal connected to the inverter, a normal open (NO) terminal connected to the battery, and a normal close (NC) terminal connected to the rectifier. In some examples, the cooking apparatus may further include a switching mode power supply (SMPS) connected to at least one of the power source or the battery and configured to provide power to the inverter. The cooking apparatus may further include a DC/DC converter connected to the battery and configured to supply power to the SMPS.

In some examples, the driving unit may be further configured to determine whether the set power level exceeds the reference level. In some examples, the cooking apparatus may further include a resonance capacitor connected to the heating coil and configured to, together with the heating coil, determine a resonance frequency that limits a maximum power of the cooking apparatus.

According to another aspect, a method is provided for operating an induction heat cooking apparatus including a rectifier connected to a power source, a battery configured to store power, a switch configured to connect to at least one of the rectifier or the battery, an inverter connected to the switch, and a heating coil connected to the inverter. The method includes receiving a selection of a wired mode or a wireless mode, connecting the switch to the rectifier or the battery based on the selection of the wired mode or the wireless mode, in which the switch is connected to the rectifier in the wired mode, and the switch is connected to the battery in the wireless mode, supplying a voltage to the heating coil based on power supplied from at least one of the rectifier or the battery that is connected to the switch, and generating magnetic fields based on flow of current through the heating coil to thereby heat a cooking device.

Implementations according to this aspect may include one or more of the following features. For example, the method may further include charging the battery by the power source based on the switch connecting to the rectifier. The method may further include supplying power charged in the battery to the heating coil based on the switch connecting to the battery.

In some implementations, the method may further include receiving a command for setting a power level, controlling the switch to connect to the rectifier based on the set power level exceeding a reference level, and controlling the switch to connect to the battery based on the set power level being below the reference level. The inverter may include an IGBT having a maximum switching frequency that limits a minimum output power of the cooking apparatus, where the method may further include setting the reference level to the minimum output power of the cooking apparatus. In some examples, the maximum switching frequency of the IGBT may exceed a resonance frequency of the cooking apparatus.

The details of one or more implementations are set forth in the accompanying drawings and the description below. Other features will be apparent from the description and drawings, and from the claims.

DETAILED DESCRIPTION

Description will now be given in detail according to exemplary implementations disclosed herein, with reference to the accompanying drawings. For the sake of brief description with reference to the drawings, the same or equivalent components may be provided with the same reference numbers, and description thereof will not be repeated. In general, a suffix such as “module” and “unit” may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the implementations presented herein are not limited by the accompanying drawings. As such, the present disclosure should be construed to extend to any alterations, equivalents and substitutes in addition to those which are particularly set out in the accompanying drawings.

It will be understood that although the terms first, second, etc., may be used herein to describe various elements, these elements should not be limited by these terms. These terms are generally only used to distinguish one element from another.

It will be understood that when an element is referred to as being “connected with” another element, the element can be connected with the other element or intervening elements may also be present. In contrast, when an element is referred to as being “directly connected with” another element, there are no intervening elements present.

A singular representation may include a plural representation unless it represents a definitely different meaning from the context. Terms such as “include” or “has” are used herein and should be understood that they are intended to indicate an existence of several components, functions or steps, disclosed in the specification, and it is also understood that greater or fewer components, functions, or steps may likewise be utilized.

Hereinafter, an induction heat cooking apparatus according to various implementations will be described in detail with reference to the accompanying drawings.

Figure 1:
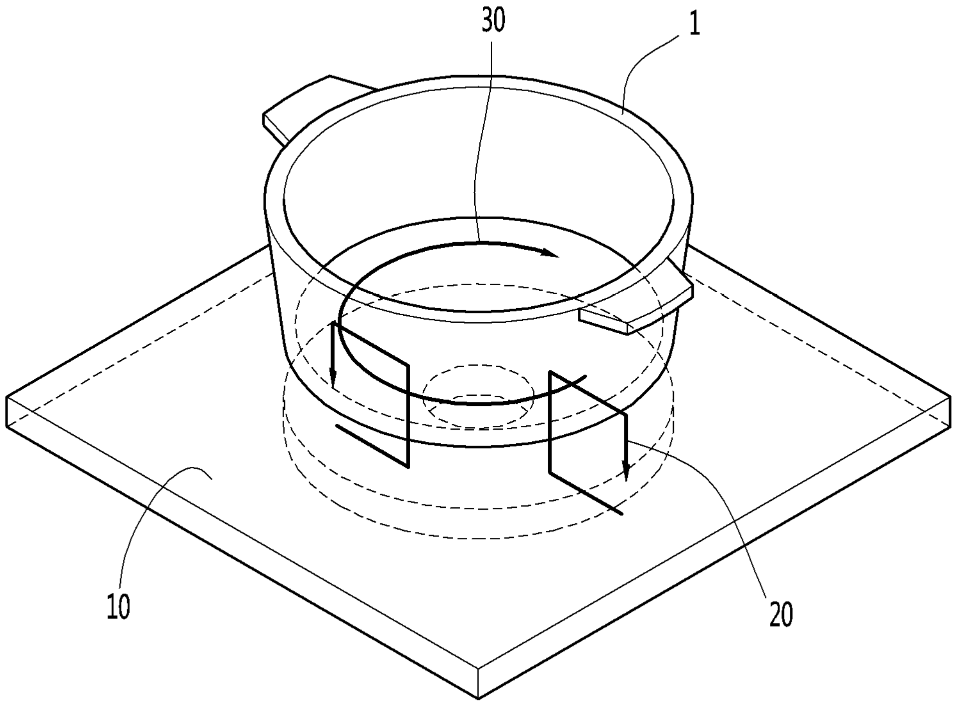
FIG. 1 is a view of an example induction heat cooking apparatus and an example operation of the cooking apparatus.

FIG. 1 illustrates an example operation of an example induction heat cooking apparatus.

Referring to FIG. 1, a cooking device 1 may be disposed on an induction heat cooking apparatus 10. The induction heat cooking apparatus 10 may heat the cooking device 1 disposed thereon.

An example method for heating the cooking device 1 by using the induction heat cooking apparatus 10 will be described. The induction heat cooking apparatus 10 may generate magnetic fields 20. A portion of the magnetic fields 20 generated in the induction heat cooking apparatus 10 may pass through the cooking device 1.

If an electric resistance component is contained in a material that forms the cooking device 1, the magnetic fields 20 may generate an eddy current 30 in the cooking device 1. The eddy current 30 heats the cooking device 1 itself, and the heat is conducted to and transferred to an inside of the cooking device 1. The induction heat cooking apparatus 10 operates to cook the contents of the cooking device 1.

If the electric resistance component is not contained in the material that forms the cooking device 1, the eddy current 30 may not be generated. In this case, the cooking device 1 may not be heated. Thus, to heat the cooking device 1 by using the induction heat cooking apparatus 10, the cooking device 1 may include a stainless steel container, or a metal container such as enamel or cast iron container.

An example method for generating the magnetic fields 20 by using the induction heat cooking apparatus 10 will be described with reference to FIG. 2.

Figure 2:
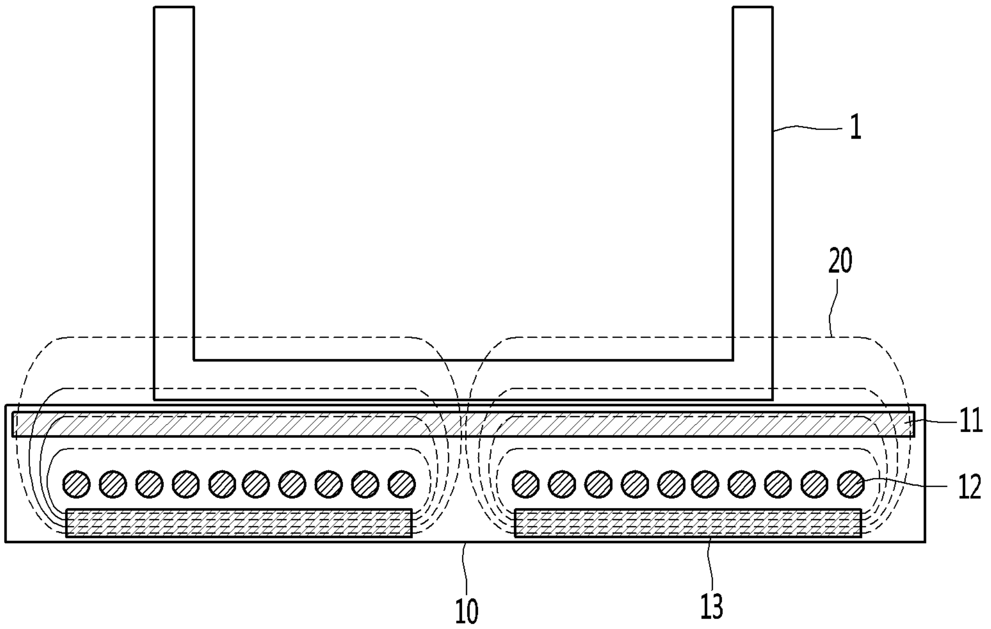
FIG. 2 is a side cross-sectional view of the example induction heat cooking apparatus.

FIG. 2 is a side cross-sectional view of the example induction heat cooking apparatus.

As illustrated in FIG. 2, the induction heat cooking apparatus 10 may include at least one of an upper plate glass 11, a heating coil 12, and a ferrite 13.

First, the components that constitute the induction heat cooking apparatus 10 will be described in detail.

The upper plate glass 11 may protect the induction heat cooking apparatus 10 (e.g., an inside of the cooking apparatus 10) and support the cooking device 1.

For example, the upper plate glass 11 may include a tempered glass made of a ceramic material that can be synthesized with various minerals. Thus, the inside of the induction heat cooking apparatus 10 may be protected from the outside. Also, the upper plate glass 11 may support the cooking device 1 disposed thereon so that the cooking device 1 may be disposed on an upper portion of the upper plate glass 11.

The heating coil 12 may generate the magnetic fields 20 for heating the cooking device 1.

For example, the heating coil 12 may be disposed below the upper plate glass 11.

Current may flow or may not flow through the heating coil 12 depending on power that is controlled to turn on/off the induction heat cooking apparatus 10. When the current flows through the heating coil 12, an amount of current flowing through the heating coil 12 may vary according to a firepower level of the induction heat cooking apparatus 10.

When the current flows through the heating coil 12, the heating coil 12 may generate the magnetic fields 20. The more an amount of current flowing through the heating coil 12 increases, the more the intensity of the magnetic fields 20 may increase. The magnetic fields 20 generated in the heating coil 12 may pass through the cooking device 1. The magnetic fields 200 passing through the cooking device 1 may encounter the electrical resistance component contained in the cooking device 1 to generated eddy current. The eddy current may heat the cooking device 1 to cook the contents of the cooking device 1.

A flow direction of the magnetic fields 200 generated in the heating coil 12 may be determined by a direction of the current flowing through the heating coil 12. When AC current flows through the heating coil 12, the flow direction of the magnetic fields 20 may be converted by a frequency of the AC current. For example, when AC current of about 60 Hz flows through the heating coil 12, the flow direction of the magnetic fields 20 is converted about 60 times per second.

The ferrite 13 is a component for protecting an internal circuit of the induction heat cooking apparatus 10.

For example, the ferrite 13 serves as a shield for blocking an influence of the magnetic fields 20 generated in the heating coil 12 or electromagnetic fields generated from the outside on the internal circuit of the induction heat cooking apparatus 10.

For example, the ferrite 13 may include a material having high permeability. The ferrite 13 may induce the magnetic fields introduced into the induction heat cooking apparatus 10 that flows through the ferrite 13 without being radiated. FIG. 2 illustrates a state in which the magnetic fields 20 generated in the heating coil 12 moves by the ferrite 13.

Figure 3:
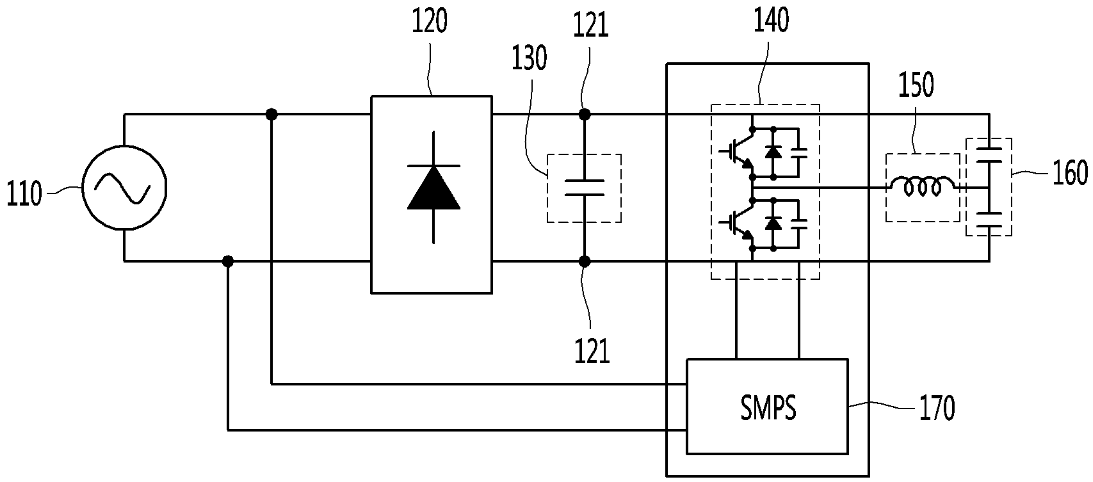
FIG. 3 is a circuit diagram illustrating an example induction heat cooking apparatus according to a related art.

FIG. 3 is a circuit diagram illustrating an example of an induction heat cooking apparatus according to a related art. For example, FIG. 3 is a circuit diagram of the induction heat cooking apparatus including one inverter and one heating coil.

Referring to FIG. 3, the induction heat cooking apparatus includes at least one of a rectifier 120, a DC link capacitor 130, an inverter 140, a heating coil 150, a resonance capacitor 160, and a switching mode power supply (SMPS) 170.

An external power source 110 may be an alternation current (AC) input power source. The external power source 110 may supply AC power to the induction heat cooking apparatus. In more detail, the external power source 110 may supply the AC power to the rectifier 120 of the induction heat cooking apparatus.

The rectifier 120 is an electrical device for converting AC power into DC power.

The rectifier 120 converts an AC voltage supplied through the external power source 110 into a DC voltage.

Both DC terminals of the rectifier 120, through which the DC voltage is outputted, may be called DC links. A voltage measured at each of both the DC terminals 121 is referred to as a DC link voltage. When resonance curves are the same, output power may vary according to the DC link voltage.

The DC link capacitor 130 serve as a buffer between the external power source 110 and the inverter 140. For example, the DC link capacitor 130 may be used to maintain the DC link voltage converted through the rectifier 120 and supply the DC link voltage up to the inverter 140.

The inverter 140 serves as a switch for switching the voltage applied to the heating coil 150 so that high-frequency current flows through the heating coil 150. The inverter 140 drives a switching device, which is generally provided as an insulated gate bipolar transistor (IGBT), to allow the high-frequency current to flow through the heating coil 150, thereby generating high-frequency magnetic fields in the heating coil 150.

The current may flow or may not flow through the heating coil 150 depending on whether the switching device is driven. When the current flows through the heating coil 150, the magnetic fields may be generated. The heating coil 150 may generate the magnetic fields based on the flow of the current to heat the cooking device.

The heating coil 150 has one side connected to a connection point of the switching device of the inverter 140 and the other side connected to the resonance capacitor 160.

The driving of the switching device may be performed by a driving unit. A high-frequency voltage may be applied to the heating coil 150 while the switching devices alternately operate under the control of a switching time outputted from the driving unit. Also, since the turn on/off time of the switching device, which is applied from the driving unit, is controlled to be gradually compensated, the voltage supplied to the heating coil 150 may be converted from a low voltage into a high voltage.

The resonance capacitor 160 is a component that serves as a buffer. The resonance capacitor 160 may adjust a saturation voltage rising ratio during the turn-off of the switching device to affect energy loss during the turn-off time.

The SMPS 170 is a power supply device for efficiently converting the power according to the switching operation. The SMPS 170 converts the DC input voltage into a square-wave voltage and then obtains the DC output voltage controlled through a filter. The SMPS 170 may control the flow of the power by using a switching process to minimize unnecessary loss.

A resonance frequency of the induction heat cooking apparatus, which has the circuit diagram as illustrated in FIG. 3, is determined by an inductance value of the heating coil 150 and a capacitance value of the resonance capacitor 160.

Also, a resonance curve may be formed based on the determined resonance frequency. The resonance curve may represent power outputted according to a frequency band.

Figure 4:
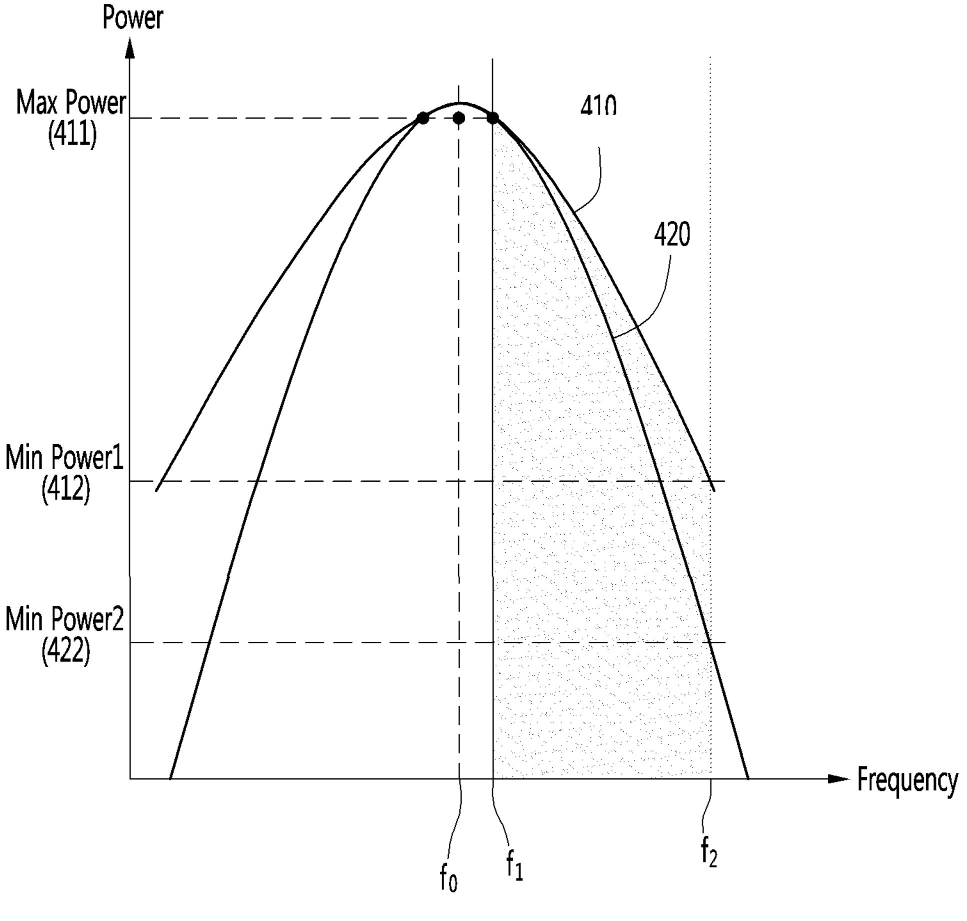
FIG. 4 is a view illustrating example output characteristics of the induction heat cooking apparatus.

FIG. 4 is a view illustrating example output characteristics of the induction heat cooking apparatus.

A quality (Q) factor may be determined according to the inductance value of the heating coil and the capacitance value of the resonance capacitor, which are provided in the induction heat cooking apparatus. The resonance curves are different from each other according to the Q factor. Thus, the induction heat cooking apparatus may have output characteristics different from each other according to the inductance value of the heating coil and the capacitance value of the resonance capacitor.

The resonance curve according to the Q factor will be described with reference to FIG. 4. For example, as the Q factor increases, the curve has a shaper shape. As the Q factor decreases, the curve has a broader shape. Referring to a first resonance curve 410 and a second resonance curve 420, which are illustrated in FIG. 4, a Q factor of the first resonance curve 410 is less than that of the second resonance curve 420.

In the first and second resonance curves 410 and 420 of FIG. 4, a horizontal axis represents a frequency, and a vertical axis represents outputted power. In the first and second resonance curves 410 and 420, a frequency at which maximum power is outputted is called a resonance frequency $f_0$.

In some examples, the induction heat cooking apparatus uses a frequency in a right side region with respect to the resonance frequency $f_0$ of the resonance curve where the frequency is larger than the resonance frequency $f_0$. For example, the induction heat cooking apparatus may adjust output power by decreasing the frequency as a firepower level increases and by increasing the frequency as the firepower level decreases.

For example, the induction heat cooking apparatus may control frequencies corresponding to a range from a first frequency $f_1$ to a second frequency $f_2$. As the firepower of the induction heat cooking apparatus is adjusted, the frequency may be changed into one frequency of the first frequency $f_1$ to a second frequency $f_2$.

The first frequency $f_1$ that is a minimum frequency controllable by the induction heat cooking apparatus and the second frequency $f_2$ that is a maximum frequency controllable by the induction heat cooking apparatus may be previously set. For example, the first frequency $f_1$ may be about 20 kHz, and the second frequency $f_2$ may be about 75 kHz.

Since the first (minimum) frequency $f_1$ is set to about 20 kHz, a case in which the induction heat cooking apparatus uses an audible frequency (about 16 Hz to about 20 kHz) may be prevented from occurring. Therefore, noises of the induction heat cooking apparatus may be reduced by operating the cooking apparatus with a frequency greater than the audible frequency.

The second frequency $f_2$ may be set to an IGBT maximum switching frequency. The IGBT maximum switching frequency may represent an operable maximum frequency in consideration of an internal pressure and capacity of the IGBT switching device. For example, the IGBT maximum switching frequency may be about 75 kHz. However, the set values of the first frequency $f_1$ and the second frequency $f_2$ are merely illustrative and are not limited thereto.

A resonance curve according to the Q factor will be described with reference to the first and second resonance curves 410 and 420.

In case of the first resonance curve 410, a variation in output due to the variation of the frequency is less. In case of the second resonance curve 420, a variation in output due to the variation of the frequency is large. That is, the more the Q factor increases, the more the variation in output due to the variation of the frequency is sensitive, and thus, it is difficult to control the frequency.

The maximum power 411 outputted from the first and second resonance curves 410 and 420 are the same. For example, the maximum power 411 may range from 2 kW to 3 kW. The first minimum power 412 outputted from the first resonance curve 410 is greater than second minimum power 422 outputted from the second resonance curve 420. That is, as the Q factor decreases, it is easy to control the frequency. However, it is difficult to output low power.

Thus, in the induction heat cooking apparatus, the turn-on and the turn-off of the power are repeatedly performed to output the low power. For example, when the induction heat cooking apparatus is designed to match the first resonance curve 410, power may be repeatedly turned on and off to output a lower power than the first minimum power 412. In this example, the turn-on/off of the power are repeatedly performed to lower a mean value of the output power.

Figure 5:
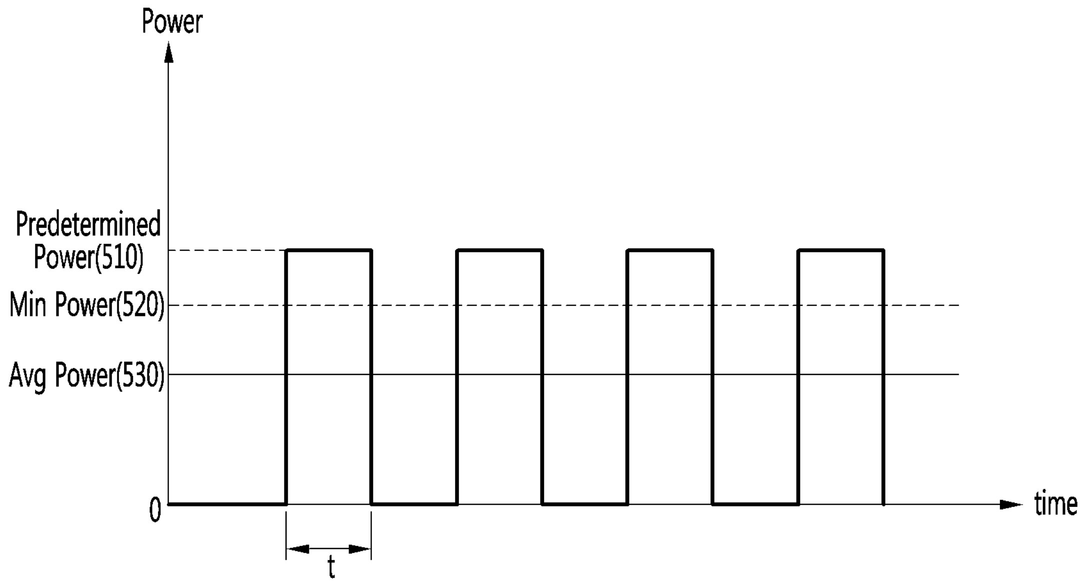
FIG. 5 is a graph illustrating an example method for outputting power by repeatedly performing turn on/off of the power through the induction heat cooking apparatus.

A method for outputting the low power by repeatedly performing the turn on/off of the power through the induction heat cooking apparatus will be described with reference to FIG. 5. FIG. 5 is a graph illustrating a method for outputting power by repeatedly performing turn on/off of the power through the induction heat cooking apparatus.

In the graph of FIG. 5, a horizontal axis represents time, and a vertical axis represents power outputted from the induction heat cooking apparatus.

For example, the lowermost power that is capable of being outputted by the induction heat cooking apparatus may be minimum power 520 of FIG. 5. The minimum power 520 may about 500 W. However, the induction heat cooking apparatus may output power less than the minimum power 520 using the example method described above. That is, the induction heat cooking apparatus repeatedly perform the output of predetermined power 510 and the turn-off of the power to output power less than the minimum power 520.

The induction heat cooking apparatus may turn on the power to output the predetermined power 510 for a time t, and turn off the power for the time t, and then turn on the power to output the predetermined power 510 for the time t. In some examples, the above-described operations may be repeatedly performed. Therefore, the induction heat cooking apparatus may cause an effect similar that average power 530 is outputted for the corresponding time. Here, the average power 530 may be power corresponding to two times of power that is intended to be finally outputted.

However, according to the above-described characteristics, it may be difficult to maintain constant power. Also, the turn on/off of the power may be repeated and may generate noises.

According to an aspect of the present disclosure, the induction heat cooking apparatus in which the output power is easily controlled, and the low power is capable of being outputted may be provided.

Figure 6:
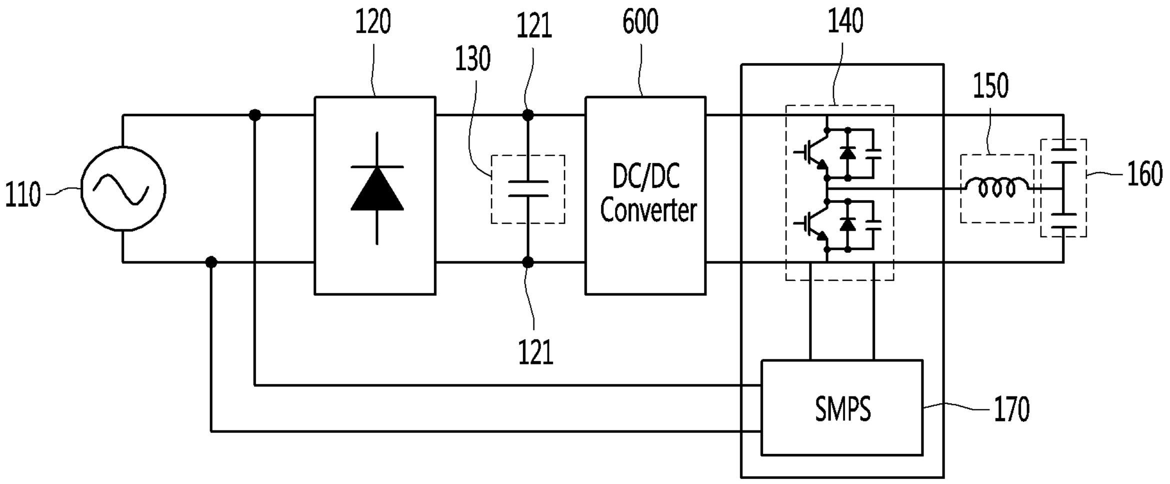
FIG. 6 is a circuit diagram of an example induction heat cooking apparatus.

FIG. 6 is a circuit diagram of an induction heat cooking apparatus according to a first implementation.

For example, an induction heat cooking apparatus may include at least one of a rectifier 120, a DC link capacitor 130, a DC/DC converter 600, an inverter 140, a heating coil 150, and a resonance capacitor 160.

The same contents with respect to the components described with reference to FIG. 3 will be omitted.

An AC power is inputted into the rectifier 120 through an external power source 110, and the rectifier 120 converts an AC voltage into a DC voltage.

Here, a DC link voltage measured at each of both DC terminals 121 may be proportional to output power. For example, although the resonance curves have the same shape, output power may be different according to the DC link voltage. That is, the more the DC link voltage increases, the output power increases. The more the DC link voltage decreases, the output power decreases.

The induction heat cooking apparatus according to the first implementation may include the DC/DC converter 600 to adjust the output power.

The DC/DC converter 600 may adjust and supply a DC link voltage according to power that is intended to be outputted. For example, the DC/DC converter 600 may adjust the DC link voltage to a lower DC voltage corresponding to the power that is intended to be finally outputted and then supply the lower DC link voltage to the inverter 140.

Figure 7:
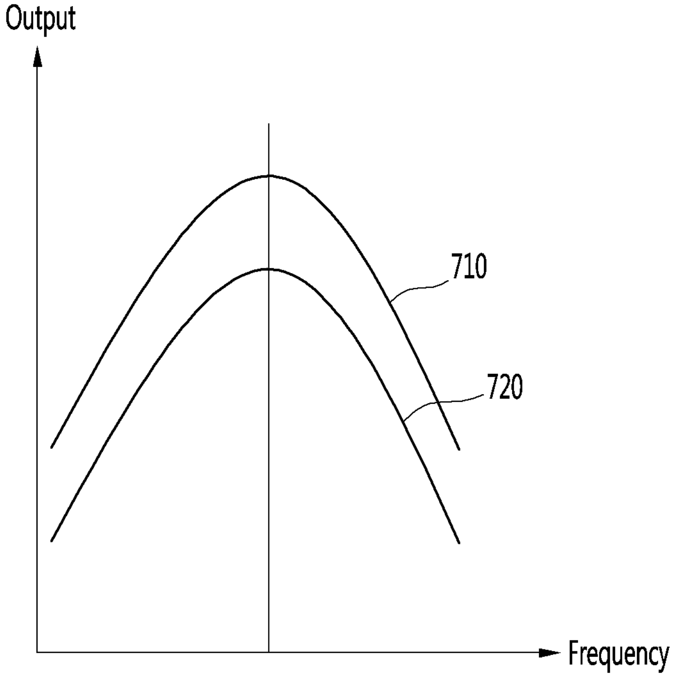
FIG. 7 is a graph illustrating example output power curves according to a DC link voltage.

FIG. 7 is a view illustrating a state in which output power can change according to a DC link voltage.

Referring to FIG. 7, a first resonance curve 710 represents a resonance curve according to a DC link voltage, and a second resonance curve 720 represents a resonance curve according to a voltage adjusted by a DC/DC converter 600. As shown in FIG. 7, as the DC/DC converter 600 adjusts a DC link voltage, the output power may be adjustable.

That is, according to the first implementation, the induction heat cooking apparatus may have an effect in which the low power is constantly outputted by using the same resonance curve.

Figure 8:
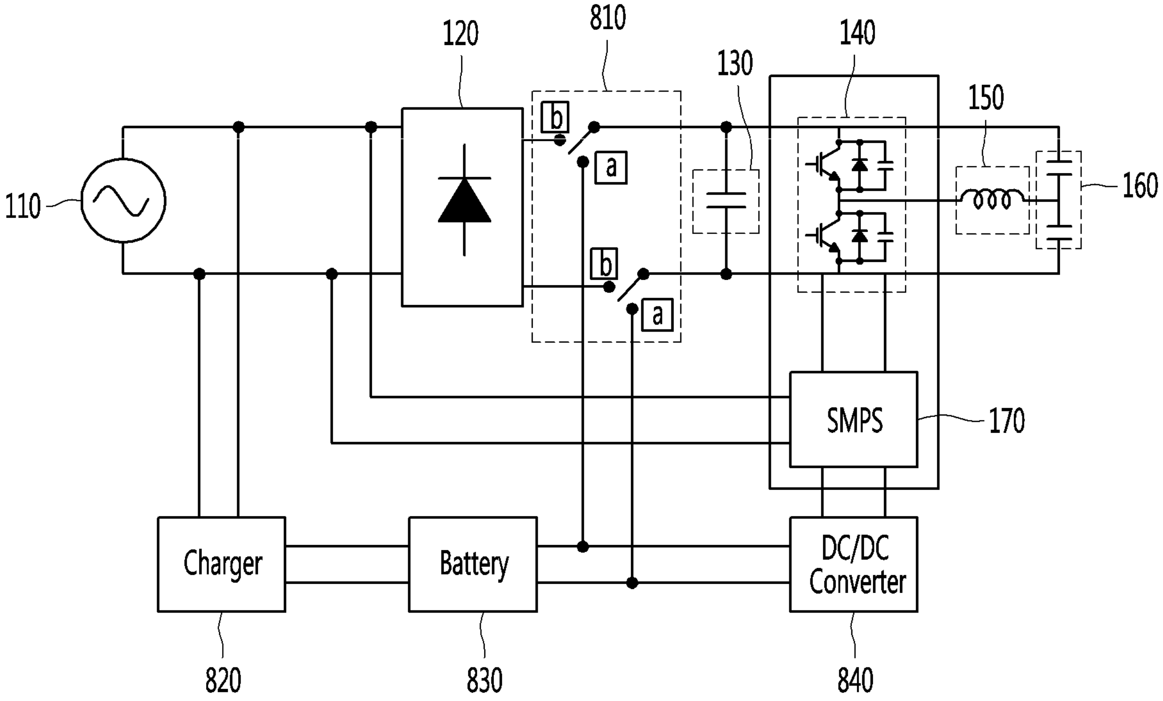
FIG. 8 is a circuit diagram of another example induction heat cooking apparatus.

FIG. 8 is a circuit diagram of an example induction heat cooking apparatus according to a second implementation.

An induction heat cooking apparatus according to a second implementation may include at least one of a rectifier 120, a DC link capacitor 130, an inverter 140, a heating coil 150, a resonance capacitor 160, an SMPS 170, a switch 810, a charger, a battery 830, and a DC/DC converter 840.

Similarly, the same contents with respect to the components described with reference to FIG. 3 will be omitted.

The switch 810 may select a power supply source. Referring to the circuit diagram of FIG. 8, the switch 810 may be disposed at a DC link terminal. The switch 810 may select one of power stored in an input AC power source 110 and a battery 830 as a power supply source. That is, the switch 810 may be connected to one of the external power source 110 and the battery 830. Referring to FIG. 8, when the switch 810 is connected to a contact point b, the switch 810 may be connected to the external power source 110. When the switch 810 is connected to a contact point a, the switch 810 may be connected to the battery 830.

The switch 810 may be a three-terminal relay, for instance. In examples where the switch 810 is a three-terminal relay, a common (COM) terminal may be connected to the inverter 140, a normal open (NO) terminal may be connected to the battery 830, and a normal close (NC) terminal may be connected to the external power source 110. In this case, the induction heat cooking apparatus heats a cooking device by using the external power source 110 unless a separate command is input because NC the NC terminal is connected to the external power source 110. The induction heat cooking apparatus may heat the cooking device by the battery 830 when an event occurs. The event may include an operation command for setting a wireless mode or a command for adjusting a firepower level below a reference level.

In some examples, operation of the switch 810 may be controlled by a driving unit. In some cases, the driving unit may control an operation of each of the components of FIG. 8.

The inverter 140 may supply current to the heating coil 150 by using a voltage supplied from the power supply source connected by the switch 810. The power supply source connected by the switch 810 may represent the external power source 110 or the battery 830.

When current flows by the inverter 140, the heating coil 150 may generate magnetic fields to heat the cooking device.

The charger 820 may introduce the power into the battery 830. For example, the charger 820 may acquire power from the external power source 110 to charge the battery 830.

For example, the charger 820 may charge the battery 830 while the switch 810 is connected to the external power source 110. That is, the charger 820 may charge the battery 830 while the induction heat cooking apparatus operates in a wired mode and may stop the charging of the battery 830 while the induction heat cooking apparatus operates in a wireless mode.

The battery 830 may store power. The battery 830 may store power introduced through the charger 820 and use the stored power whenever the power needs. For example, the battery 830 may be charged while the switch 810 is connected to the external power source 110. On the other hand, when the battery 830 is connected to the switch 810, the battery 830 may be discharged to supply a voltage to the inverter 140. Thus, the battery 830 may supply power to the inverter 140 while the induction heat cooking apparatus is not connected to the external power source 110. Thus, the induction heat cooking apparatus that operates in the wireless mode may be realized through the battery 830. As described above, according to the second implementation, the induction heat cooking apparatus may use one inverter topology to realize both of the wired operation and the wireless operations. That is, the wired/wireless inverter topology may be shared. This will be described later in detail.

Also, the battery 830 may be a component for allowing the induction heat cooking apparatus to constantly output low power. That is, the battery 830 may output a low-voltage DC voltage so that the induction heat cooking apparatus constantly linearly outputs the low power. In this case, the induction heat cooking apparatus may constantly supply the lower power than the output power according to an IGBT maximum switching frequency.

The battery 830 may be a lithium ion battery. In this case, when the battery 830 is charged, constant current (CC) charging may start. That is, while a voltage increases, constant current may be continuously supplied to charge the battery 830. Thereafter, when reaching a target charging voltage, the battery 830 may perform constant voltage (CV) charging. This is to charge remainder after the fast charging. While the CV charging is performed, the voltage may be constantly maintained. As the charging runs out, the current may be reduced.

The DC/DC converter 840 may convert the voltage supplied from the battery 830. For example, the DC/DC converter 840 may convert the voltage supplied from the battery 830 and be connected to the SMPS 170. Thus, it may prevent an operation of the SMPS 170 from being stopped.

The SMPS 170 may supply power required for operating the inverter 140. The connection between the inverter 140 and the power supply source (the external power source 110) or the battery 830 may be stopped according to the operation of the switch 810. In this case, the stop of the operation of the inverter 140 may occur. The SMPS 170 may supply the constant power to the inverter 140 to prevent the operation of the inverter 140 from being stopped. For example, the SMPS 170 may supply DC power of about 12 V or about 5 V to the inverter 140.

Figure 9:
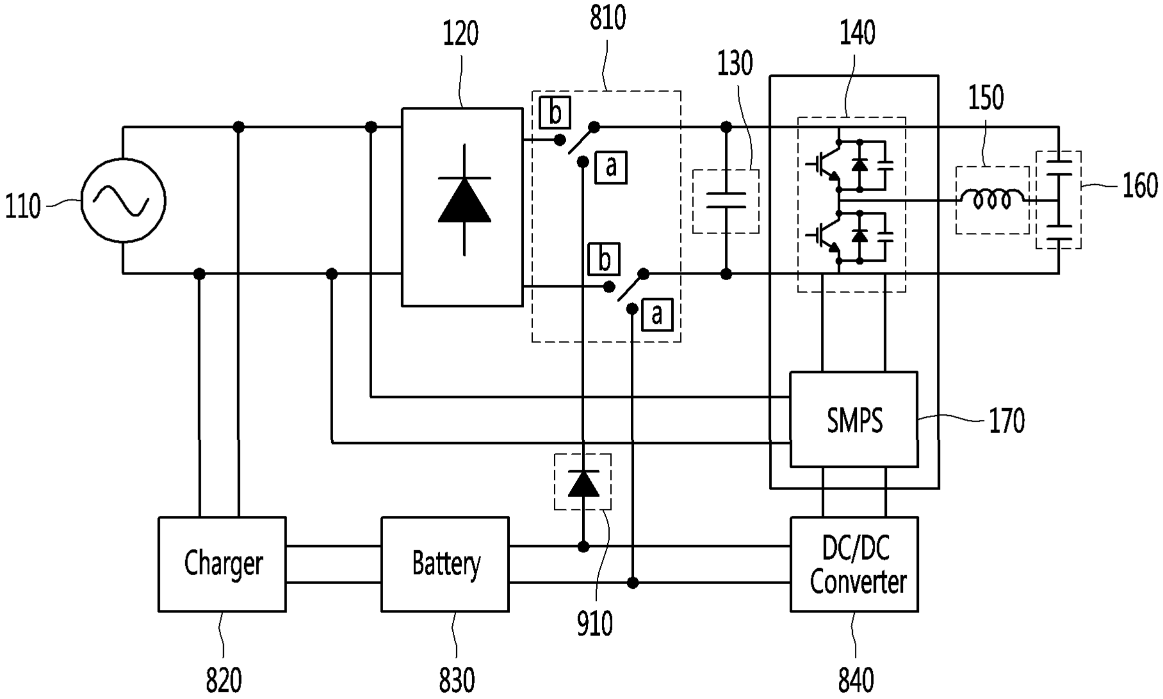
FIG. 9 is a circuit diagram of another example induction heat cooking apparatus.

FIG. 9 is a circuit diagram of an induction heat cooking apparatus according to a third implementation.

The induction heat cooking apparatus according to the third implementation may further include a diode 910 in the circuit diagram of FIG. 8. Referring to FIG. 9, the diode 910 may have one side connected to a switch 810 and the other side connected to a connection point between a battery 830 and a DC/DC converter 840.

The diode 910 according to an implementation may prevent an external power source 110 and the battery 830 from being short-circuited with each other. If the external power source 110 and the battery 830 are short-circuited with each other, the circuit may be damaged, or the battery 830 may be exploded.

In some examples, the diode 910 may be disposed on an outer terminal of the battery 830 to prevent the external power source 110 and the battery 830 from being short-circuited with each other when the switch 810 is normally driven or abnormally driven due to breakdown. In this case, the short circuit between the external power source and the battery may be mechanically/electrically prevented to secure safety.

The rest components except for the diode 910 are the same as those of FIG. 8.

According to the third implementation, the induction heat cooking apparatus, which is secured in safety and is capable of operating in the wired/wireless manner, may be provided.

Figure 10:
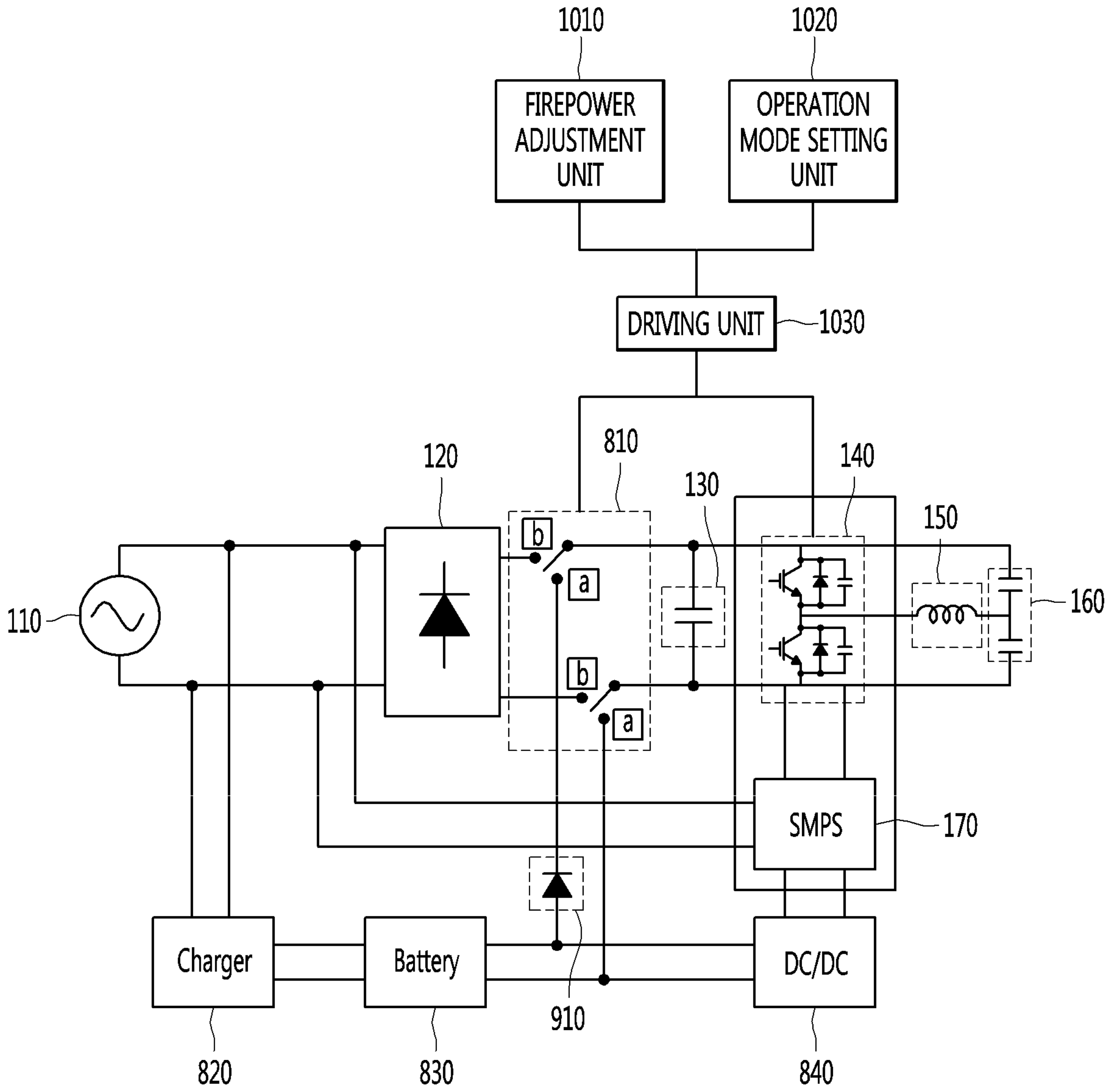
FIG. 10 is a structural view illustrating an example method for operating the induction heat cooking apparatus.

FIG. 10 is a structural view for explaining an example method for operating the induction heat cooking apparatus.

The induction heat cooking apparatus according to the first to third implementations may further include a firepower adjustment unit 1010 and a driving unit 1030. For example, the induction heat cooking apparatus according to the second and third implementations may further include a firepower adjustment unit, an operation mode setting unit 1020, and a driving unit 1030.

The method for operating the induction heat cooking apparatus will be described as an example in case of the induction heat cooking apparatus of FIG. 10 according to the third implementation, which further includes the firepower adjustment unit, the operation mode setting unit 1020, and the driving unit 1030. However, this may be merely illustrative for explaining the abovementioned implementations and also be applied to other implementations. Also, although the firepower adjustment unit 1010 and the operation mode setting unit 1020 are connected to the driving unit 1030, and the driving unit 1030 is connected to the switch 810 and the inverter 140 in FIG. 10, this may be merely illustrative. Each of the components may have a configuration different from that of each of the components of FIG. 10. For example, the firepower adjustment unit 1010, the operation mode setting unit 1020, and the driving unit 1030 may be provided in the inverter 140.

First, the firepower adjustment unit 1010 may be a component for setting heat applied from the induction heat cooking apparatus to the cooking device. For example, in the induction heat cooking apparatus, the heat applied to the cooking device may be divided into N firepower levels. The N firepower levels may include a first firepower level, a second firepower level, . . . , an N-th firepower level. Here, as the number increases, the applied heat may increase firepower.

The firepower adjustment unit 1010 may receive a firepower adjustment command for selecting one of the first firepower level to the N-th firepower level. The firepower adjustment command may represent a command for adjusting the firepower levels of the heat applied from the induction heat cooking apparatus to the cooking device.

The operation mode setting unit 1020 is a component for setting the operation modes of the induction heat cooking apparatus to one of the wired mode or the wireless mode. Thus, the operation mode setting unit 1020 may receive the command for selecting one of the wired mode and the wireless mode. When the induction heat cooking apparatus operates in the wired mode, the induction heat cooking apparatus uses power supplied from the external power source 110. When the induction heat cooking apparatus operates in the wireless mode, the induction heat cooking apparatus uses power supplied from the battery 830. The driving unit 1030 may control a connection position of the switch 810 according to the operation mode set through the operation mode setting unit 1020.

The driving unit 1030 controls an overall operation of each of the components constituting the induction heat cooking apparatus. For example, the driving unit 1030 may control the switch 810 and the inverter 140.

For example, the driving unit 1030 may control the switch 810 and the inverter 140 so that heat corresponding to the firepower level set through the firepower adjustment unit 1010 is applied to the cooking device. That is, the driving unit 1030 may control a connection position of the switch 810 according to the firepower levels. In addition, the driving unit 1030 may control an amount of current supplied from the inverter 140 to the heating coil according to the firepower level.

In some example, the driving unit 1030 may control the switch 810 to operate in the mode set through the operation mode setting unit 1020. For example, when the driving unit 1030 is set to the wired mode, the switch 810 may be connected to a terminal of the external power source 110. When the driving unit 1030 is set to the wireless mode, the switch 810 may be connected to a terminal of the battery 830.

As described above, a method for setting the firepower level and the operation mode in the induction heat cooking apparatus to operate in the set level and mode will be described in detail with reference to FIG. 11.

Figure 11:
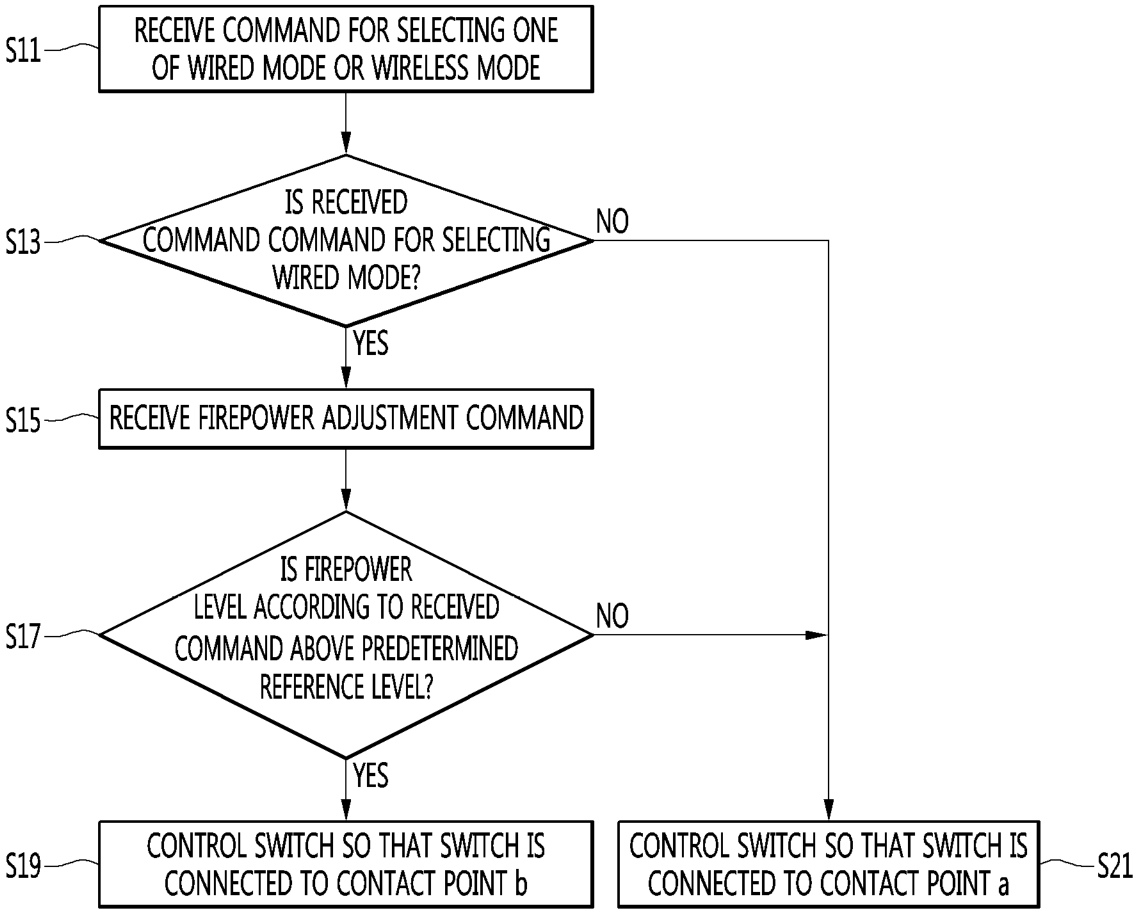
FIG. 11 is a flowchart of an example method for operating an induction heat cooking apparatus.

FIG. 11 is a flowchart of a method for operating the induction heat cooking apparatus according to an implementation. For example, FIG. 11 is a flowchart of a method for operating the induction heat cooking apparatus according to the second and third implementations.

An operation mode setting unit 1020 may receive a command for selecting one of a wired mode or a wireless mode (S11).

A command for selecting one of the wired mode or the wireless mode may be inputted according to convenience of a user. Thus, the operation mode setting unit 1020 may receive the command for selecting one of the wired mode or the wireless mode.

The driving unit 1030 may determine whether the received command is the command for selecting the wired mode (S13).

For example, the driving unit 1030 may determine whether the command received through the operation mode setting unit 1020 is the command for selecting the wired mode or the command for selecting the wireless mode.

When it is determined that the received command is not the command for selecting the wired mode, the driving unit 1030 may control the switch 801 so that the switch 810 is connected to a contact point a (S21).

That is, when it is determined that the received command is the command for selecting the wireless mode, the driving unit 1030 may control the switch 810 so that the switch 810 is connected to the contact point a. The contact point a may be a terminal connected to the battery 830. The operation, in which the switch 810 is connected to the contact point a to heat the cooking device, will be described below.

When it is determined that the received command is the command for selecting the wired mode, the driving unit 1030 may receive a firepower adjustment command through the firepower adjustment unit 1010 (S15).

The firepower adjustment unit 1010 may receive the firepower adjustment command for selecting one of the first firepower level to the N-th firepower level. Here, the reference symbol N that represents the level of the firepower levels may vary according to a design of the induction heat cooking apparatus.

The driving unit 1030 may determine whether the firepower level according to the received command is above a predetermined reference level (S17).

The first firepower level to N-th firepower level may be divided into levels using the external power source 110 and levels using the battery 830 with respect to the preset reference level. For example, in the firepower level above the preset reference level, the induction heat cooking apparatus heats the cooking device by using the external power source 110. If the firepower level is below the preset reference level, the induction heat cooking apparatus heats the cooking device by using the battery 830. As described above, one reason in which the battery 830 is used in the firepower level below the reference level may be to constantly output low power without repeatedly performing turn on/off of the power.

The reference level may be determined according to output power in relation with an IGBT maximum switching frequency. For example, the driving unit 1030 may acquire a level that can divide the firepower levels into first firepower levels in which power higher than the output power is outputted, and second firepower levels in which power lower than the output power is outputted according to the IGBT maximum switching frequency. The driving unit may set the acquired level as the reference level.

The driving unit 1030 may determine whether the firepower, which adjusted through the preset reference level according to the above-described method, is above the reference level.

When it is determined that the firepower level according to the received command is above the predetermined reference level, the driving unit 1030 controls the switch 810 so that the switch 810 is connected to a contact point b (S19).

The contact point b is a terminal connected to the external power source 110.

When it is determined that the firepower level according to the received command is below the predetermined reference level, the driving unit 1030 controls the switch 810 so that the switch 810 is connected to the contact point a (S21).

The contact point a may be a terminal connected to the battery 830.

Figure 12A:
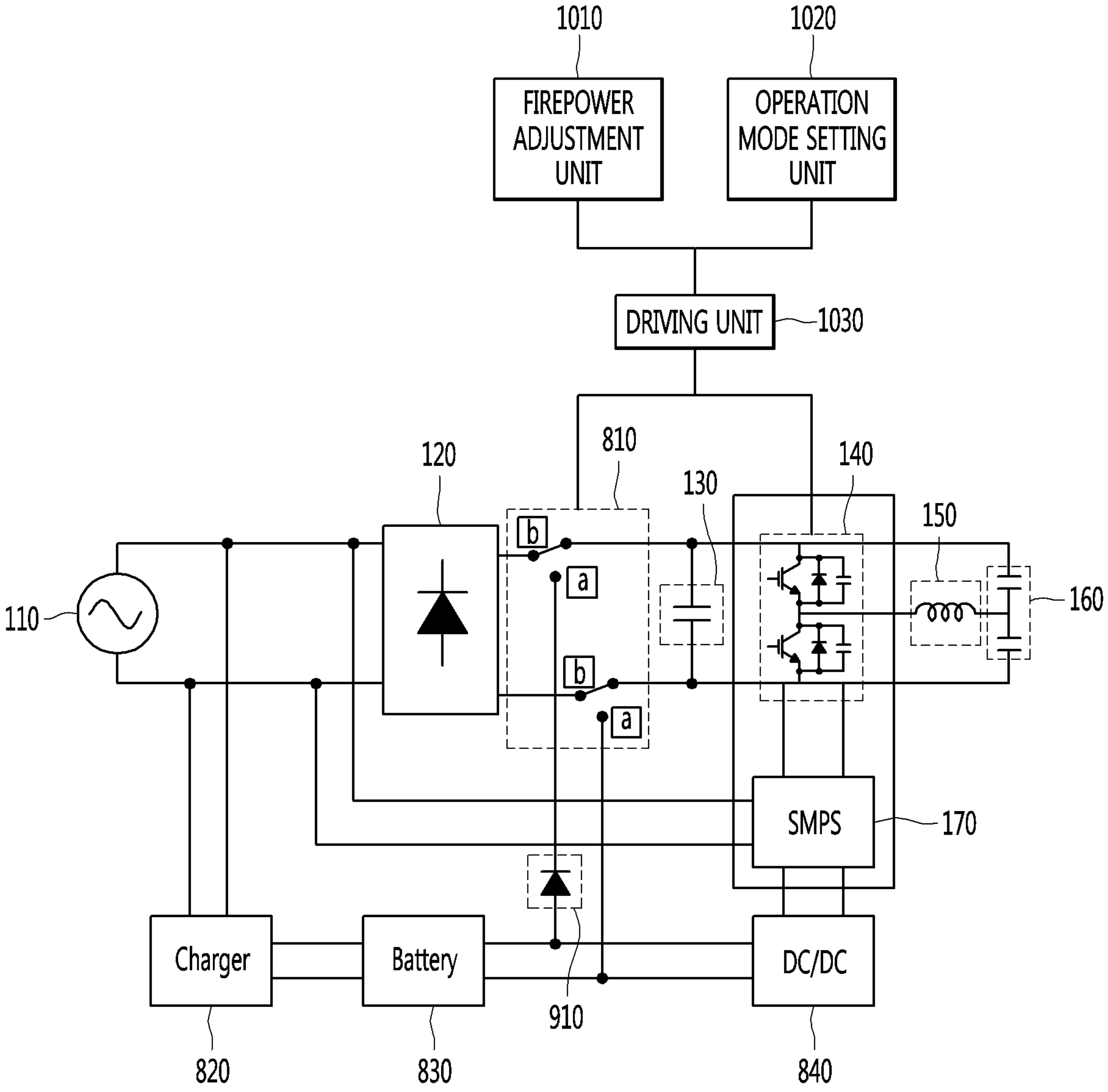
FIGS. 12A to 12B are view illustrating an example operation state when an example switch of the induction heat cooking apparatus is connected to an example external power source.

A method for operating the induction heat cooking apparatus according to the connection position of the switch 810 will be described with reference to FIGS. 12A to 12B and 13A to 13B. For example, FIGS. 12A to 12B are view illustrating an operation state when a switch of the induction heat cooking apparatus is connected to the external power source, and FIGS. 13A to 13B are view illustrating an operation state when the switch of the induction heat cooking apparatus is connected to the battery.

Figure 12B:
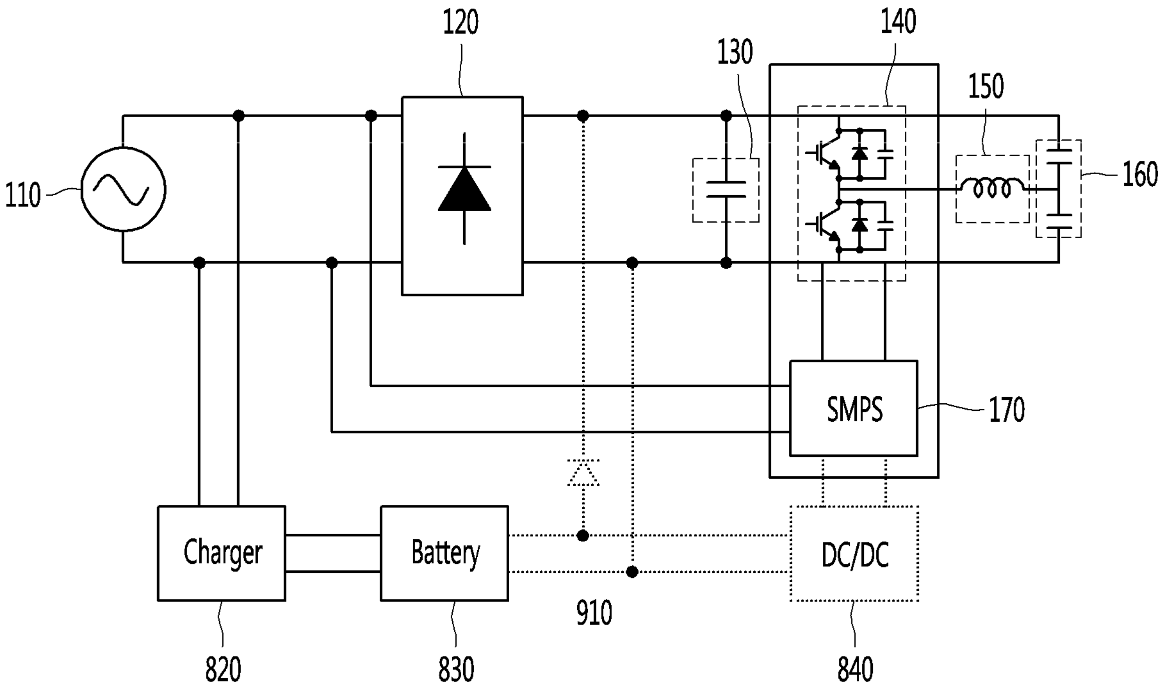
Figure 13A:
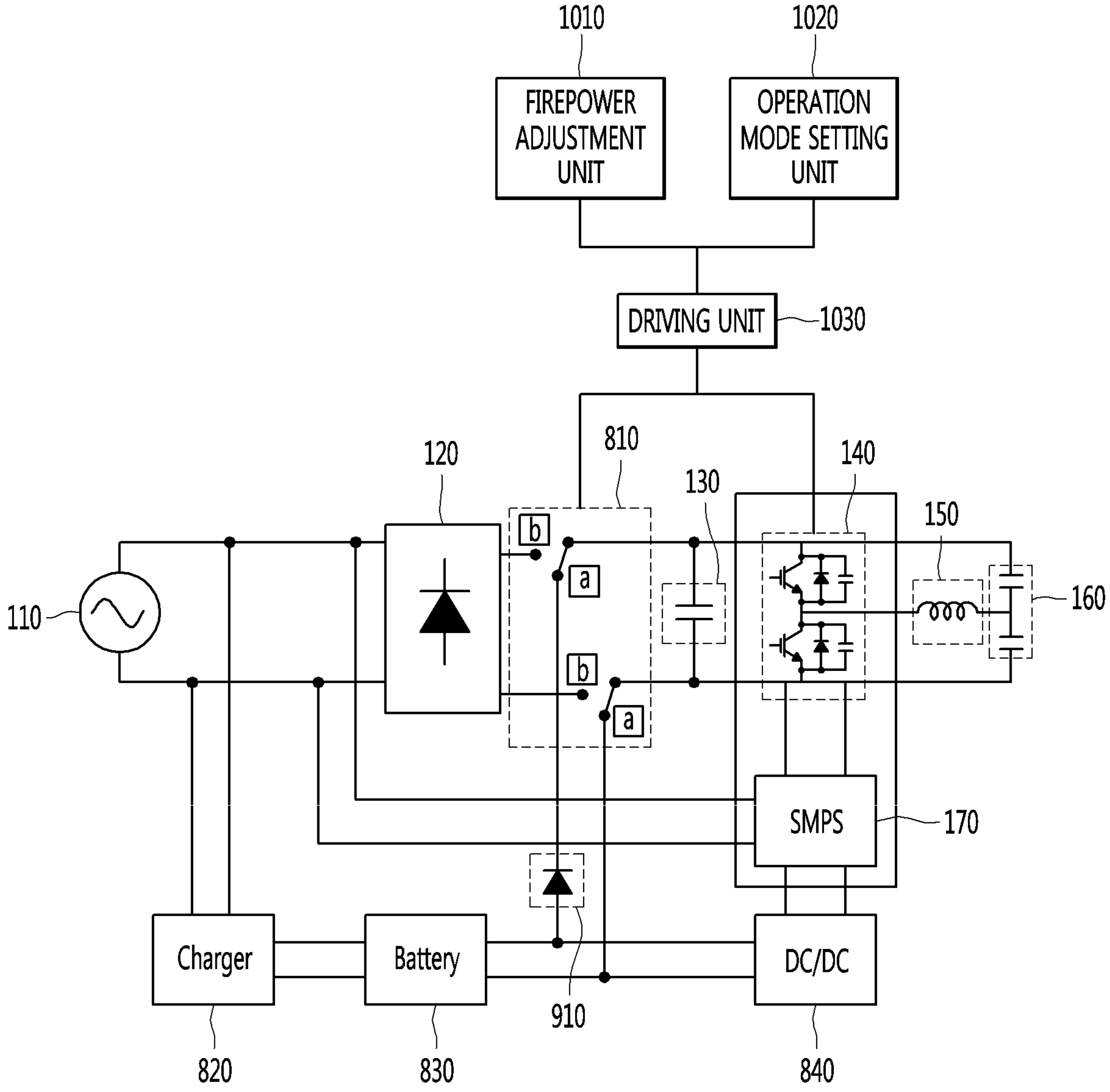
FIGS. 13A to 13B are view illustrating an example operation state when the switch of the induction heat cooking apparatus is connected to an example battery.
Figure 13B:
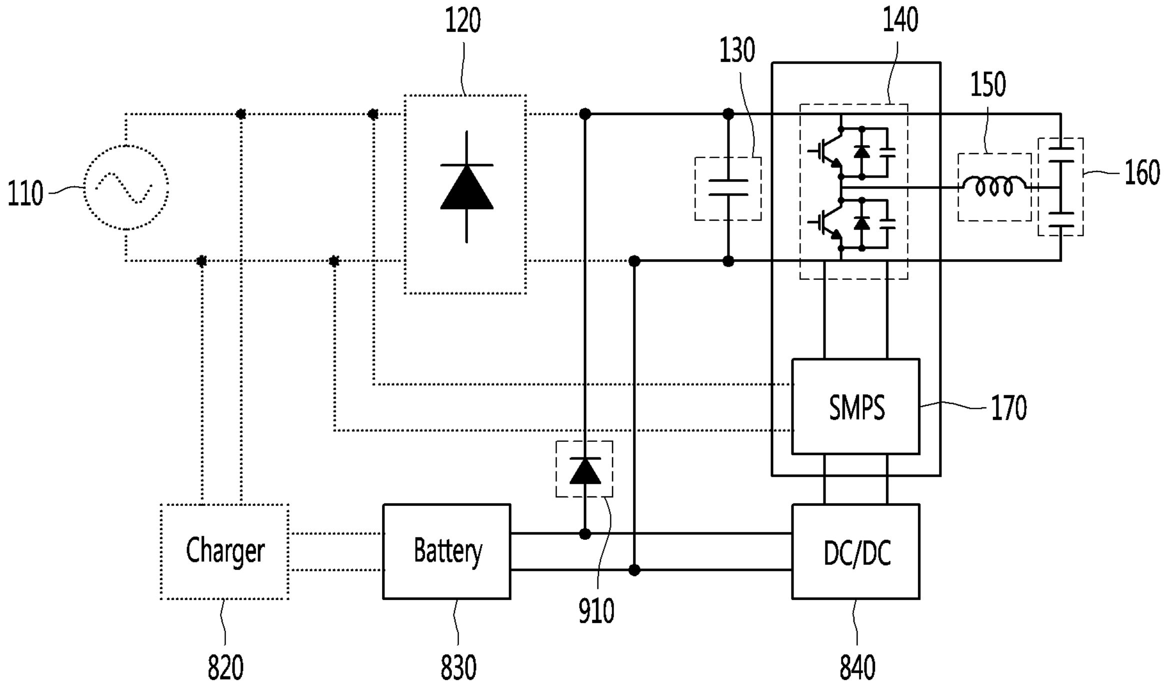

A component expressed as a solid line of FIGS. 12B and 13B and a component expressed as a dotted line of FIGS. 12B and 13B are shown to distinguish operating (connected) components from non-operating (disconnected) components based on the connection position of the switch.

When a firepower level is above the reference level while operating in the wired mode, the driving unit 1030 may control the switch 810 so that the switch 810 is connected to the contact point b as illustrated in FIG. 12A. Thus, the switch 810 is connected to the terminal of the external power source 110.

An operation flowchart of the induction heat cooking apparatus as the switch is connected to the external power source 110 will be described with reference to FIG. 12B.

When the switch 810 is connected to the external power source 110, as illustrated in FIG. 12B, the inverter 140 and the external power source 110 are connected to each other, and the connection between the inverter 140 and the battery 830 may be prevented. For example, an AC voltage supplied from the external power source 110 is introduced into a rectifier 120, and a DC voltage outputted through the rectifier 120 is supplied to the inverter 140. The inverter 140 may convert the supplied DC voltage into an AC voltage to supply the converted AC voltage to the heating coil 150. When the AC voltage is supplied from the inverter 140, current flows through the heating coil 150. Thus, when the current flow, magnetic fields may be generated in the heating coil 150 to heat the cooking device.

In some examples, while the switch 810 is connected to the terminal of the external power source 110, the external power source 110 may supply a voltage to a charger 820 as well as the rectifier 120. The charger 820 charges the battery 830 by using the voltage supplied from the external power source 110. The battery 830 may store the power supplied through the external power source 110.

When the wireless mode is performed, or the firepower level is below the predetermined reference level, as illustrated in FIG. 13A, the driving unit 1030 may control the switch 810 so that the switch 810 is connected to the contact point a. Thus, the switch 810 is connected to the terminal of the battery 830.

When the switch 810 is connected to the battery 830, as illustrated in FIG. 13B, the inverter 140 is connected the battery 830, and the connection between the inverter 140 and the external power source 110 may be prevented or open. Thus, the battery 830 supplies the DC voltage to the inverter 140. The inverter 140 allows the current to flow through the heating coil 150 by using the supplied DC voltage, and the heating coil 150 generates the magnetic fields due to the flowing of the current to heat the cooking device.

The battery 830 may supply a voltage for outputting the power lower than the output power according to the IGBT maximum switching frequency to the inverter 140. As described above, the battery 830 constantly outputs the low voltage, and the induction heat cooking apparatus constantly output the low power to provide a function for keeping warm the cooking device.

Figure 14:
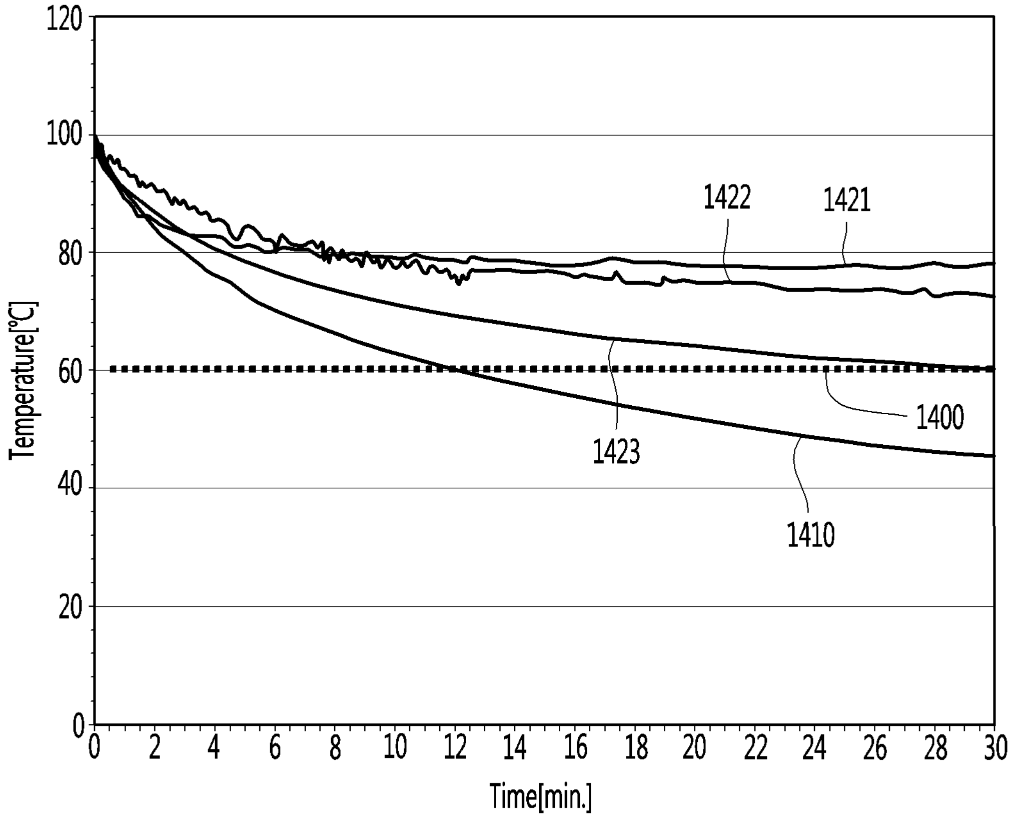
FIG. 14 is experimental data showing an example effect in which the induction heat cooking apparatus keeps warm an example cooking device by using an example battery.

An effect in which the induction heat cooking apparatus keeps warm the cooking device by using the battery according to an implementation will be described with reference to FIG. 14. FIG. 14 is experimental data showing an effect in which the induction heat cooking apparatus keeps warm the cooking device by using a battery according to an implementation.

The graph of FIG. 14 illustrates a variation in temperature of contents when the induction heat cooking apparatus outputs the low power to heat the cooking device containing a content having a temperature of about 100 degrees. For example, the graph illustrated in FIG. 14 is an illustrative graph in a case in which the content is water.

For example, a reference dotted-line 1400 in FIG. 14 represents a minimum temperature (about 60 degrees) of the content, which is measured when the induction heat cooking apparatus outputs the low power by using the external power source 110, and the power turn-off operation is repeated. That is, when the induction heat cooking apparatus uses the external power source 110, the temperature may drop down to about 40 degrees.

A reference graph 1410 is a graph that illustrates a variation in temperature of the content when the content of the cooking device heated up to a temperature of about 100 degrees is stored at room temperature. When the content of the cooking device heated up to the temperature of about 100 degrees is stored at a room temperature for about 30 minutes, the temperature drop by a temperature of about 55 degrees may occur, and the content may be measured at a temperature of about 45 degrees. This shows an example where the induction heat cooking apparatus may keep warm the contents when the external power source 110 is used.

The first to third graphs 1421, 1422, and 1423 are graphs illustrating a variation in temperature when the induction heat cooking apparatus heats the cooking device by using the battery 830. For example, the first graph 1421 illustrates a variation in temperature when power of about 300 W (about 32 kHz) is outputted to heat the cooking device, the second graph 1422 illustrates a variation in temperature when power of about 200 W (about 37 kHz) is outputted to heat the cooking device, and the third graph 1423 illustrates a variation in temperature when power of about 100 W (about 50 kHz) is outputted to heat the cooking device. Referring to the graphs, the content is measured at temperatures of about 77 degrees, about 73 degrees, and about 60 degrees as about 30 minutes elapse. That is, the temperature of the content drops down by temperatures of about 23 degrees, about 27 degrees, and about 40 degrees.

This example shows that the temperatures of about 77 degrees, about 73 degrees, and about 60, which are measured through the first to third graphs 1421, 1422, and 1423, are greater than or equal to the temperature of about 60 degrees, which is a temperature measured when the external power source 110 is used. Therefore, the induction heat cooking apparatus may include the battery 830 to provide a function of keeping warm the contents.

According to the various implementations, the induction heat cooking apparatus that operates in the wireless mode as well as the wired mode may be provided.

According to the various implementations, the induction heat cooking apparatus that is easily converted into the wired mode or the wireless mode according to the user's needs to operate may be provided. For example, the induction heat cooking apparatus that is capable of operating in the wired mode or the wireless mode by using the one common inverter may be provided.

According to the various implementations, the induction heat cooking apparatus that constantly outputs the low power without repeatedly turning on/off the power may be provided.

According to the various implementations, the wired/wireless operating induction heat cooking apparatus that is capable of preventing the risk of explosion of the battery may be provided.

As the present features may be implemented in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An induction heat cooking apparatus comprising:

a rectifier configured to convert an alternating current (AC) voltage supplied from a power source into a direct current (DC) voltage;

a battery configured to store power;

a switch that is configured to connect to at least one of the rectifier based on the induction heat cooking apparatus operating in a wired mode and that is configured to connect to the battery based on the induction heat cooking apparatus operating in a wireless mode;

a charger that is configured to connect to the power source and charge the battery based on the induction heat cooking apparatus operating in the wired mode and that is configured to stop charging the battery based on the induction heat cooking apparatus operating in the wireless mode;

an inverter connected to the switch and configured to receive a first voltage from at least one of the rectifier or the battery and convert the first voltage to a second voltage; and a heating coil configured to receive the second voltage from the inverter and generate magnetic fields, the heating coil being configured to heat a cooking device based on the generated magnetic fields.

2. The cooking apparatus according to claim 1, further comprising:

an operation mode setting unit configured to receive a selection of one of the wired mode or the wireless mode; and a driving unit configured to:

control the switch to connect to the rectifier based on the selection of the wired mode, and control the switch to connect to the battery based on the selection of the wireless mode.

3. The cooking apparatus according to claim 2, wherein the battery is further configured to, based on the switch being connected to the rectifier, be charged by power received from the power source.

4. The cooking apparatus according to claim 3, wherein the battery is further configured to, based on the switch being connected to the battery, supply power to the inverter.

5. The cooking apparatus according to claim 2, further comprising a power adjustment unit configured to receive a command for setting a power level, wherein the driving unit is further configured to:

control the switch to connect to the rectifier based on the set power level exceeding a reference level, and control the switch to connect to the battery based on the set power level being below the reference level.

6. The cooking apparatus according to claim 5, wherein the inverter includes an insulated gate bipolar transistor (IGBT) switching device configured to supply current to the heating coil.

7. The cooking apparatus according to claim 6, wherein the reference level is determined by output power corresponding to a maximum switching frequency of the IGBT switching device.

8. The cooking apparatus according to claim 7, wherein the battery is further configured to supply a voltage to the inverter to thereby provide power that is less than the output power corresponding to the maximum switching frequency of the IGBT switching device.

9. The cooking apparatus according to claim 1, further comprising a diode configured to prevent the power source and the battery from being short-circuited with each other.

10. The cooking apparatus according to claim 1, wherein the switch comprises a three-terminal relay switch that includes a common (COM) terminal connected to the inverter, a normal open (NO) terminal connected to the battery, and a normal close (NC) terminal connected to the rectifier.

11. The cooking apparatus according to claim 1, further comprising a switching mode power supply (SMPS) connected to at least one of the power source or the battery and configured to provide power to the inverter.

12. The cooking apparatus according to claim 11, further comprising a DC/DC converter connected to the battery and configured to supply power to the SMPS.

13. The cooking apparatus according to claim 5, wherein the driving unit is further configured to determine whether the set power level exceeds the reference level.

14. The cooking apparatus according to claim 1, further comprising a resonance capacitor connected to the heating coil and configured to, together with the heating coil, determine a resonance frequency that defines a maximum power of the cooking apparatus.

* * * * *